A. A. THOMMEN.
BLOWER.
APPLICATION FILED AUG. 30, 1917.
1,327,218.
Patented Jan. 6, 1920.
2 SHEETS—SHEET 1.
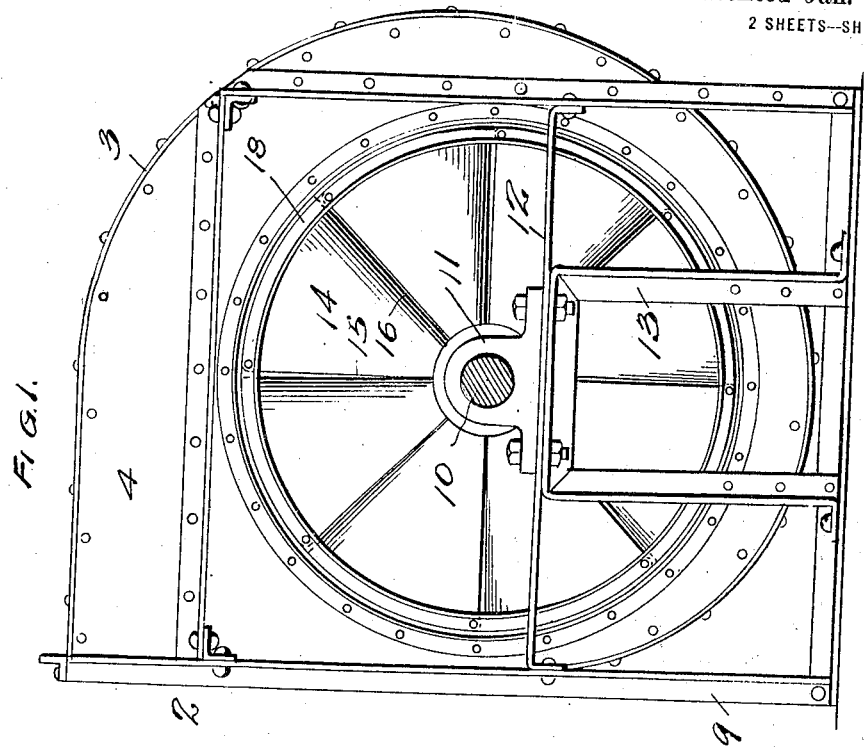
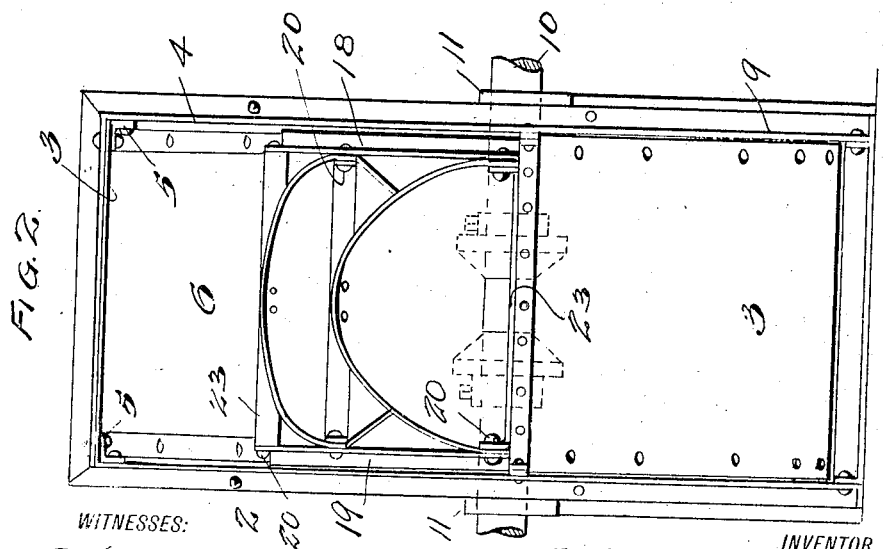
WITNESSES:
INVENTOR
A. H. THOMMEN
BY
ATTORNEY A. A. THOMMEN.
BLOWER.
APPLICATION FILED AUG. 30, 1917.
1,327,218.
Patented Jan. 6, 1920.
2 SHEETS—SHEET 2.
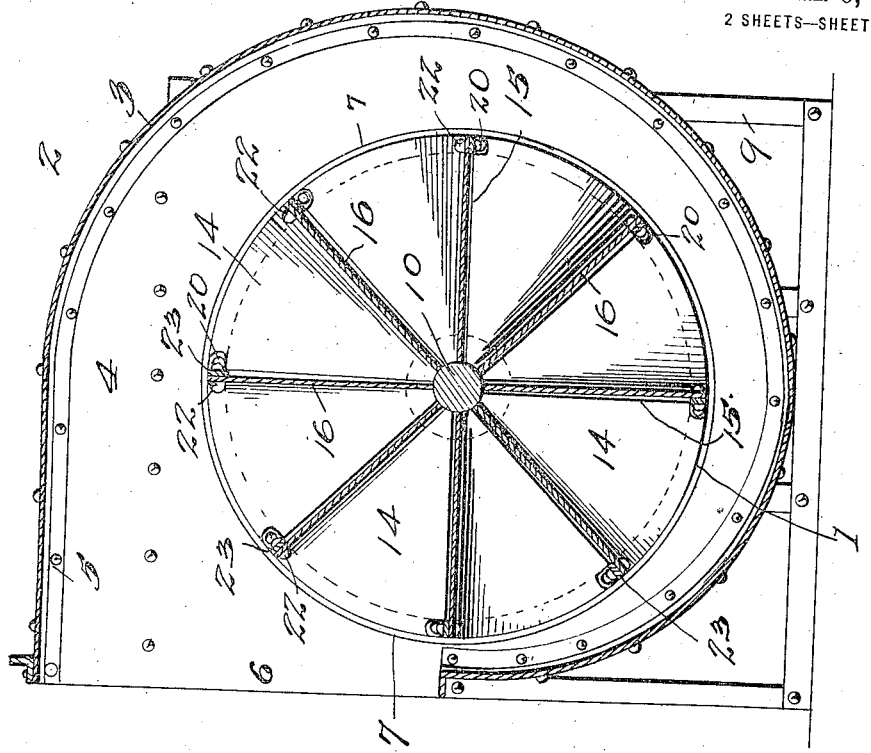
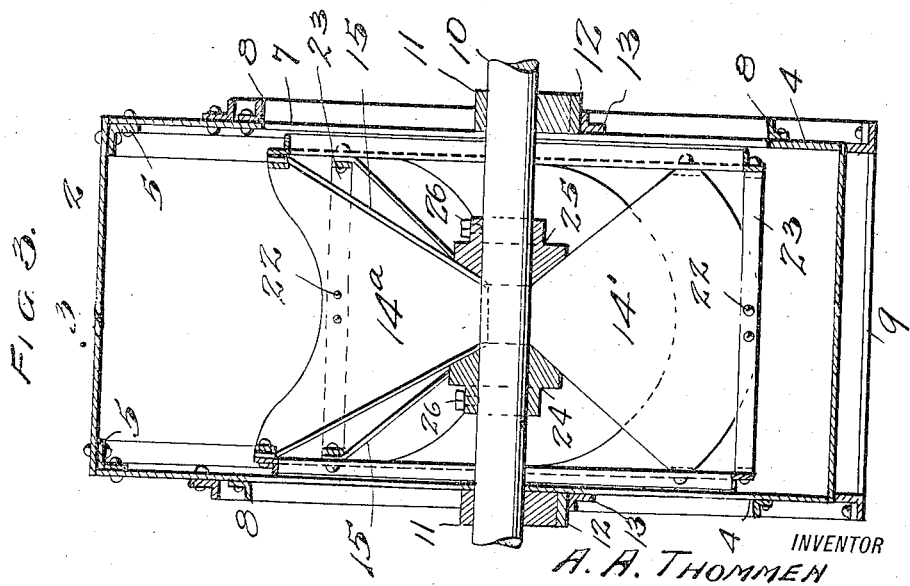
INVENTOR
A. A. THOMMEN
BY
ATTORNEY

UNITED STATES PATENT OFFICE.

ADOLPH A. THOMMEN, OF CHICAGO, ILLINOIS.

BLOWER.

1,327,218.  Specification of Letters Patent.  Patented Jan. 6, 1920.

Application filed August 30, 1917. Serial No. 188,899.

*To all whom it may concern:*

Be it known that I, ADOLPH A. THOMMEN, a citizen of the United States, residing at Chicago, in the county of Cook and State of Illinois, have invented certain new and useful Improvements in Blowers, of which the following is a specification.

The present invention relates to improvements in blowers, and especially to that type of blowers in which the intake opening or openings are at the side or sides of the blower so that the air is taken in on a line parallel with the longitudinal axis of the blower, under pressure, and discharged on a line tangential to the movement of the rotor.

The primary object of the invention is to provide a blower of high efficiency which is compact in arrangement, simple in construction and operation, composed of comparatively few parts, durable, and comparatively inexpensive in cost of production. The invention consists essentially in certain combinations and arrangements of the rotor blades with the casing and other novel features as will be hereinafter pointed out and claimed.

In the accompanying drawings I have illustrated one complete example of the physical embodiment of my invention, and in these drawings, Figure 1 is a side elevation of a blower constructed according to my invention.

Fig. 2 is an end view of the blower of Fig. 1.

Fig. 3 is a transverse sectional view of the blower and casing.

Fig. 4 is a longitudinal sectional view of the blower and casing.

In the preferred embodiment of the invention as illustrated the rotor, indicated as a whole by the numeral 1 is inclosed within the casing 2, which casing is formed with a convoluted wall 3, and side walls 4, 4. The casing is preferably of metal and the convoluted wall is riveted to the side walls by means of angle iron strips 5, 5, at the interior of the casing, the discharge end or opening of the casing being indicated by the numeral 6.

Preferably there are two intake openings, as 7, 7, at the sides of the casing, formed circular in outline and the edges of the openings are defined or bound by circular angle irons 8, 8 riveted to the sides of the casing for reinforcing the casing structure. The casing is supported in upright position by means of the rectangular frame 9, to which the casing is riveted, and the rotor is supported in the casing on the transverse shaft 10 which is journaled in bearings 11, 11, bolted or otherwise secured to the supporting bars 12, 12 which extend longitudinally of the casing at its sides and are riveted or otherwise secured to the rectangular frame bars. A U-shaped supporting brace 13, of angle iron, is centrally located beneath the bearings for the shaft to hold or support the shaft in stable relation to the casing.

In the rotor illustrated in the drawings I have shown eight blades indicated by the numeral 14. These blades are curved in shape, being in fact semiconical, *i. e.* of the outline of an object or geometrical figure obtained by cutting a cone on its longitudinal axis thus obtaining the edges 15, 15 and the center line 16, while the outer end of the blade is open with the inner end 17 closed by contact with the shaft 10. These blades are arranged circumferentially about the shaft with the lines 16 radiating diametrically from the longitudinal axis of the shaft so that the edges 15 15 are at the front of the blade, while the center or radiating line 16 of each blade is at the rear of the blade.

At their outer edges the blades are attached to a pair of side rings 18 and 19, preferably of angle iron form and located just within the intake openings of the casing. Rivets 20 are passed through the openings 21 in the blades and through similar openings in the rings, and rivets 22 at the rear portion of the blade secure the blade to a cross bar or transverse brace 23 which has flanged ends perforated for the rivets 20 to pass through, and in this manner the blade is attached at three points to the transverse brace and to the side rings, the braces of course also being attached to the side rings, thus forming a compact and strong structure. The inner ends of the blades are fixed on the shaft between a pair of spaced hubs or collars 24 and 25, and these hubs are secured on the shaft by set screws or bolts 26, thus supporting the rotor at its center so that when it is revolved the forward face of each blade is the concave surface 14$^a$, while the back or rear face of each blade is the convex surface 14$'$ as indicated in Fig. 3.

The rotor is located just within the openings 7 of the casing and the edges 15 15 which are toward the front act as front cutting edges as the rotor is revolved, and these cutting edges cut through the air and draw in air currents, under pressure, through both openings 7 7 so that the air is drawn into the rotor in a plane or direction parallel with the longitudinal axis of the shaft 10, and the continued revolution of the rotor impels the air from the small end of the blade toward the outer, larger end so that the air is impelled around the interior of the convoluted wall of the casing and forced out through the discharge opening in a continuous blast. The casing is thus formed with lateral inlet openings concentric with the axis of the rotor, and provided with a tangential outlet, while the rotor on the shaft has its blades with concave forward faces forming chambers or cups into which the revolving cutting edges of the blades force the air, and from which the air is forced by the centrifugal action of the rotor.

What I claim is:—

The combination in a blower with a convolute casing having lateral inlets and a tangential outlet, of a rotor formed with concavo-convex tapered blades having edges converging toward the inlets, spaced side rings connecting the extremities of the blades, transverse braces for the rings and blades, the forward edges of the blades being arranged approximately on line with the rear wall of the preceding blade and each of said transverse braces being connected at its ends to the extremities of one of the blades and at its center to the central rear portion of the next foremost blade.

In testimony whereof I affix my signature.

ADOLPH A. THOMMEN.